United States Patent
Dupin et al.

[11] Patent Number: 5,517,337
[45] Date of Patent: May 14, 1996

[54] RETRACTABLE HOLOGRAPHIC COMBINER

[75] Inventors: Catherine Dupin; Jean M. Darrieux, both of Bordeaux, France

[73] Assignee: Sextant Avionique, Meudon la Foret, France

[21] Appl. No.: 122,359

[22] Filed: Aug. 17, 1993

[30] Foreign Application Priority Data

Sep. 21, 1992 [FR] France ................................. 92 11193

[51] Int. Cl.⁶ .................... G03H 1/00; G02B 27/10; G02B 5/08; G02B 7/182
[52] U.S. Cl. ..................... 359/13; 359/630; 359/632; 359/872; 359/841
[58] Field of Search ............................ 359/13, 841, 842, 359/843, 844, 871, 873, 875, 630, 631, 632, 877, 841

[56] References Cited

U.S. PATENT DOCUMENTS

| | | | |
|---|---|---|---|
| 2,852,979 | 9/1958 | Hund | 359/875 |
| 3,945,716 | 3/1976 | Kinder | 359/13 |
| 4,188,090 | 2/1980 | Ellis | 359/14 |
| 4,775,218 | 10/1988 | Wood et al. | 359/14 |
| 4,951,912 | 8/1990 | Manzoni | 359/841 |
| 5,109,301 | 4/1992 | Yang | 359/841 |

FOREIGN PATENT DOCUMENTS 2174213  10/1986  United Kingdom .
8701090   2/1987  WIPO .

Primary Examiner—Paul M. Dzierzynski
Assistant Examiner—Audrey Chang
Attorney, Agent, or Firm—Kerkam, Stowell, Kondracki & Clarke; William L. Feeney

[57] ABSTRACT

A retractable holographic combiner, of the type comprising a movable holographic mirror placed before the pilot's eyes and designed for the presenting of light images collimated at infinity, superimposed on the external scene, and coming from a projector positioned upline with respect to the combiner, the holographic mirror being connected to a fixed part of the aircraft by a hinged support that provides for holding it and positioning it, wherein the support of the holographic mirror is constituted by a single lateral connecting arm comprising a first upper hinge connecting said arm by one of its ends to the fixed part of the aircraft and a second lower hinge connecting said arm by its other end to a side of the holographic mirror so as to obtain a complete retraction of the assembly.

7 Claims, 3 Drawing Sheets

RETRACTABLE HOLOGRAPHIC COMBINER

BACKGROUND OF THE INVENTION

1. Field of the Invention

The present invention relates to a holographic combiner designed to be mounted on aircraft.

The essential role of such combiners is that of presenting, before a pilot's eyes, light images that are collimated at infinity in being superimposed on the external scene.

These images are produced in relief by using the interferences between two laser beams, according to the known principle of holography.

The images come from a projector positioned upline with respect to the combiner, the relative position of this projector with respect to the holographic mirror, when it is operational, being fixed.

2. Description of the Prior Art

Such combiners are held and positioned by means of a mechanical device, and are generally mounted on the ceiling in the cockpit of the aircraft, the mounting being done in a retractable way.

Indeed, since the system for the collimation of holographic images is used only during certain stages of flight, the combiner should be capable of being stowed away, for the rest of the time, in a zone that spoils the external field of vision of the pilot to the minimum extent.

However, at the present time, the mechanical holding and positioning devices cannot be used for the total retraction of the combiners, and a part of the mechanism remains visible in the field of vision of the pilot, even when it is stowed away.

Indeed, these known devices are constituted by two arms positioned on either side of the holographic mirror, and are connected to an upper fixed part of the ceiling of the cockpit.

It is important to note that, in this type of known combiner, the holographic mirror is fixedly joined to the arm that supports it, the drawback of which is that it constitutes an assembly with a substantial space requirement, which is a penalizing factor when the assembly is stowed away, whence the difficulty of complete retraction. Furthermore, the length that is necessary for this succession of elements may force the pilot to make a backward movement to allow them to pass when the combiner is being stowed away or being put into operational position. Such a movement may be detrimental to the piloting of the aircraft.

Furthermore, lateral handles are provided on either side of the holographic mirror in order to constitute grips that are necessary for manoeuvring the apparatus without touching the holographic mirror.

It will easily be seen that such an apparatus is detrimental to clear visibility and adds to the difficulties of full retraction of the combiner.

Indeed, the greater the number of components of the combiner, the greater is the extent to which the field of vision is masked in an operational position as well as a stowed position, in the latter case because of the very difficulty of achieving complete retraction.

SUMMARY OF THE INVENTION

The object of the present invention is to overcome the above-mentioned drawbacks and hence to obtain the following functions of:

ensuring the operational position of the combiner with high repetitivity of positioning in creating the minimum degree of visual masking;

ensuring the stowing of the combiner outside the external field of vision of the pilot;

ensuring the frontward retraction of the combiner in the event of shocks when it is in an operational position.

To this effect, the invention relates to a retractable holographic combiner, to be used in an aircraft, of the type comprising a movable holographic mirror placed before the pilot's eyes and designed for the presenting of light images collimated at infinity, superimposed on the external scene, and coming from a projector positioned upline with respect to said combiner, said holographic mirror being connected to a fixed part of the aircraft by means of a hinged support that provides for holding it and positioning it, wherein the support of the holographic mirror is constituted by a single lateral connecting arm comprising a first upper hinge connecting said arm by one of its ends to the fixed part of the aircraft and a second lower hinge connecting said arm by its other end to a side of the holographic mirror so as to obtain a complete retraction of the assembly by rotation of the holographic mirror on itself about the lower hinge of the arm, said rotation being carried out prior to or simultaneously with the rotation of said arm about its upper hinge, until firstly it is in the same position as the lateral side of the holographic mirror and secondly it is completely lifted outside the external field of vision of the pilot, a folding or retraction such as this of the arm and of the mirror for a stowed position and, conversely, their unfolding or spreading out for an operational position being done by means of a grip which is also a single one, capable of being operated by only one hand.

BRIEF DESCRIPTION OF THE DRAWINGS

The invention will be understood more clearly and others of its features will be shown from the following description, made with reference to the appended schematic drawings which illustrate, by way of a non-limitative example, the way in which the invention can be achieved.

MORE DETAILED DESCRIPTION

Figure 1:
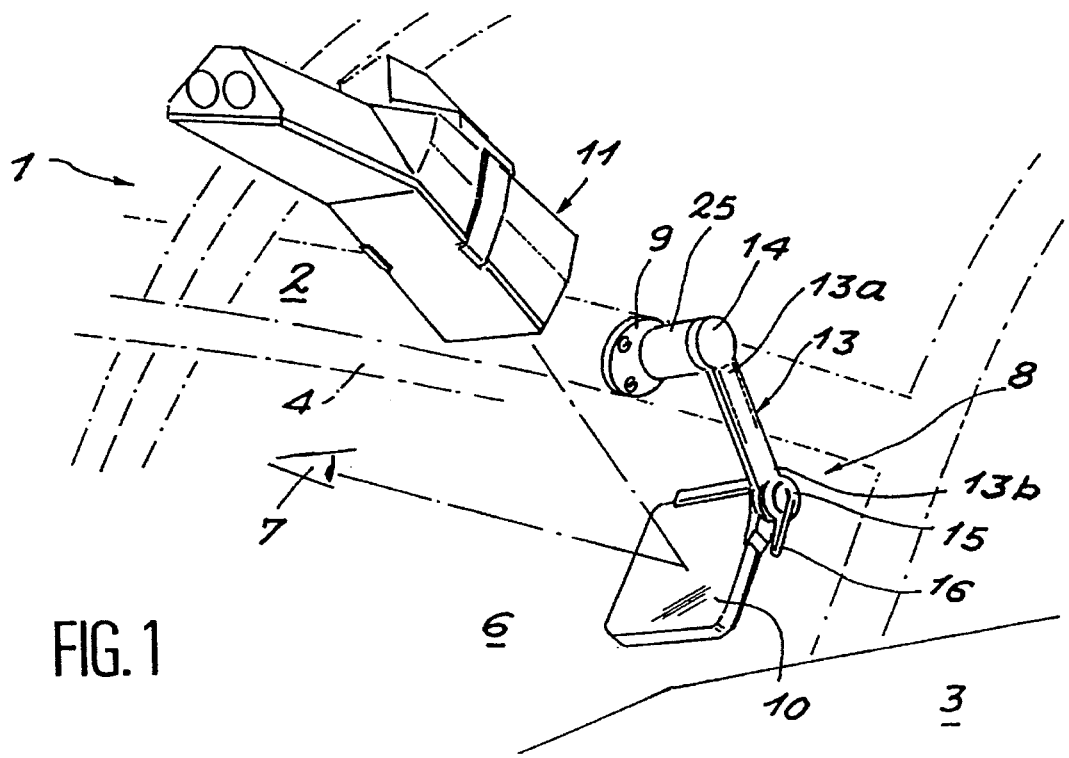
FIG. 1 shows a partial view in perspective of a cockpit comprising a retractable combiner according to the invention.
Figure 2:
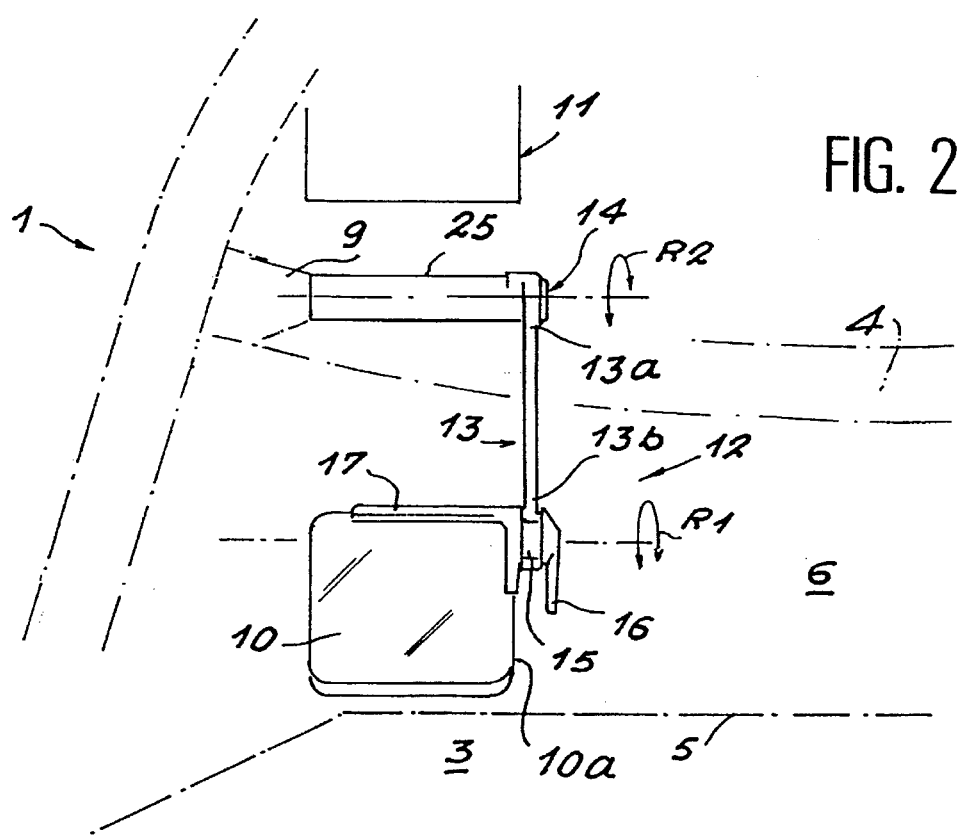
FIG. 2 is a front view derived from FIG. 1.

FIGS. 1 and 2 give a schematic view of a pilot's cabin or cockpit 1, designated on a general basis, wherein a ceiling 2 and a pilot's station 3 respectively demarcate an upper limit of visibility 4 and a lower limit of visibility 5 defining a field of vision 6 of the pilot's eye 7.

According to the invention, the cockpit 1 is fitted out with a retractable holographic combiner 8 mounted on the ceiling 2 by means of a fixed part 9.

The combiner 8 has a movable holographic mirror 10 that is placed before the pilot's eyes 7 and is designed to present light images that are collimated at infinity in being superimposed on the external scene, and that come from a projector 11 placed upline with respect to said combiner 8.

The holographic mirror 10 is connected to the fixed part 9 by means of a hinged support 12 that enables it to be held and positioned.

The support 12 of the holographic mirror 10 is constituted by a single linking arm 13 comprising a first upper hinge 14 that connects it, by one of its ends 13a, to the fixed part 9 of the aircraft and a second lower hinge 15 connecting said arm 13, by its other end 13b, to an upper part of a lateral side 10a of the holographic mirror 10.

Figure 3:
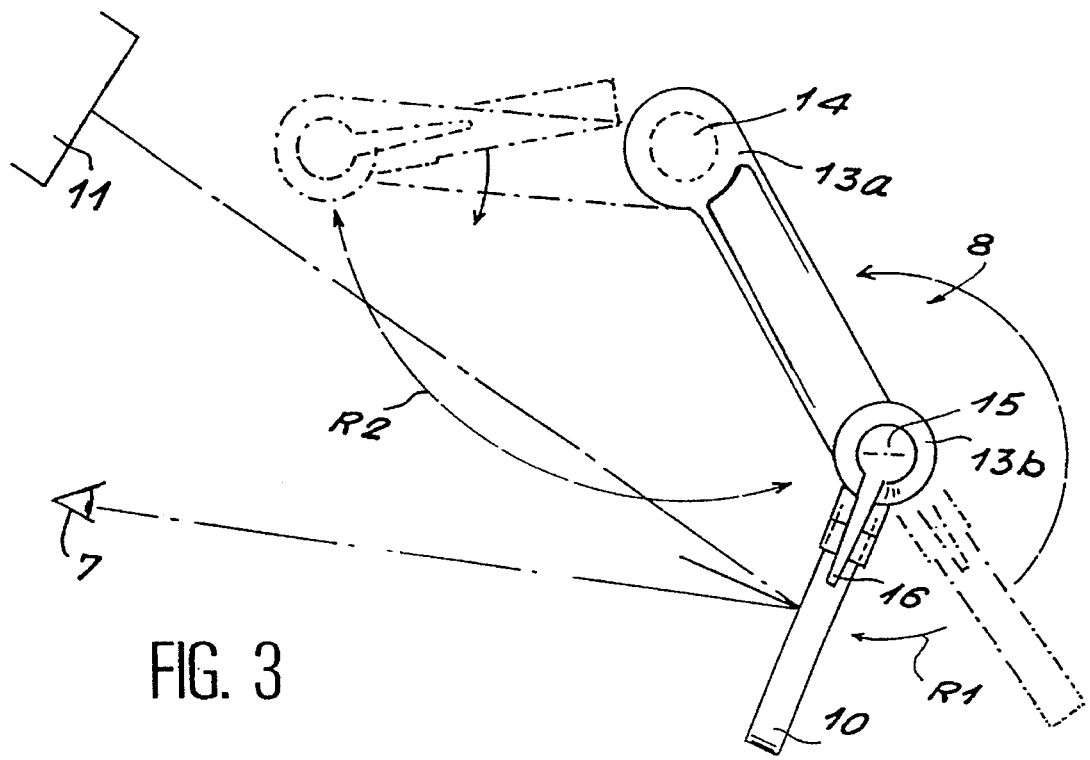
FIG. 3 is a lateral view of the combiner, placed in relation to the pilot and gives a view of the kinematics of working between a stowed position and an operational position.

As can be seen particularly well in FIG. 3, such a device, according to the invention, can be used to to obtain full retraction of the entire combiner 8, firstly by the rotation along R1 of the holographic mirror 10 on itself about the lower hinge 15 of the arm 13, this rotation being continued until the arm 13 is in the same position as the lateral side 10a of the holographic mirror 10, and secondly by the rotation along R2 of said arm 13 about its upper hinge 14 until it is completely lifted out of the external field of vision of the pilot.

The folding of the arm 13 and of the holographic mirror 10 for a stowed position and, conversely, their unfolding for an operational position, can be done by the prior rotation, along R1, of the holographic mirror 10 with respect to the arm 13 and then by the rotation, along R2, of this arm 13 with respect to the fixed part 9 about their respective hinges 15, 14, or it can also be done by the simultaneous movement, along R1 and R2, of the holographic mirror 10 and of the arm 13.

Whatever the method of operation, the combiner 8 is manoeuvred by means of a grip 16, which is also a single element, by the use of only one gripping operation in to a natural movement of the pilot's arm.

According to another feature of the invention, the grip 16, acting during manoeuvring on the assembly formed by the holographic mirror 10 and the linking arm 13, is directly connected to the hinge 15 of the holographic mirror which goes through the lower end 13b of said arm 13 so that the single arm 13 and the single grip 16 bring about only a minimum visual masking when the assembly is unfolded.

The grip 16 is connected to the holographic mirror 10 by means of a angle bracket 17 positioned in its upper right-hand corner for example, and is fixedly joined to the lower hinge 15 for a screw-nut system 18.

According to another feature of the invention, the deflections of the linking arm 13 with respect to the fixed part 9 of the aircraft and of the holographic mirror 10 with respect to said arm 13 about their respective upper hinge 14 and lower hinge 15 are limited angularly so as to ensure good repetitivity of the positioning of the holographic mirror 10 with respect to the image projector 11.

Figure 4:
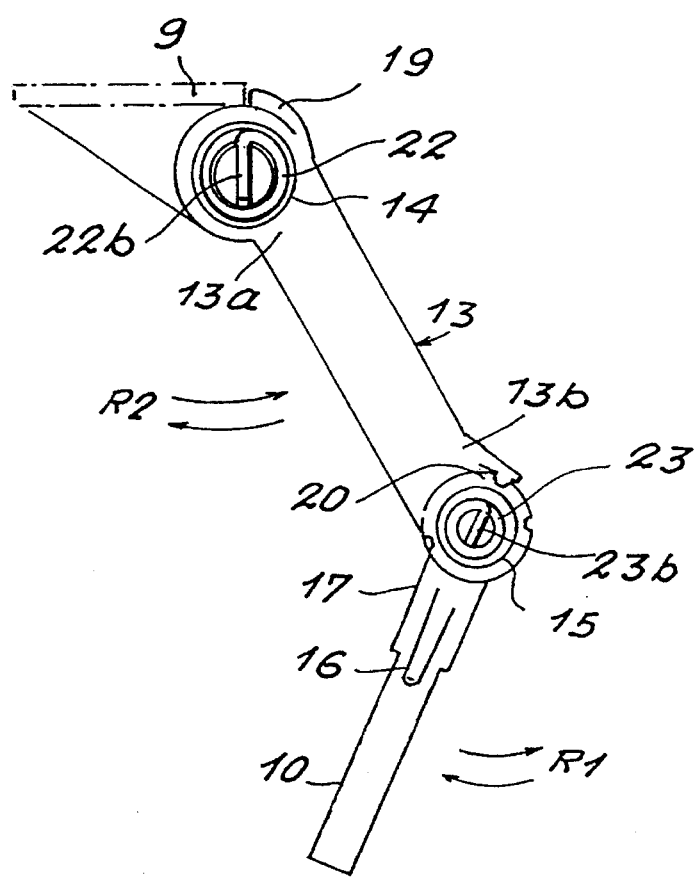
FIG. 4 is a schematic view of the combiner in an operational position.

Limitation of the angular deflections of the linking arm 13 (FIG. 4) with respect to the fixed part 9 of the aircraft and of the deflections of the holographic mirror 10 with respect to said arm 13 is obtained by means of stops 19, 20 respectively positioned between the fixed part 9 of the aircraft and the upper end 13a of the arm 13 and between the lower part 13b of the arm 13 and the lateral side of the holographic mirror 10.

In this way, the angular deflection of the linking arm 13 during the unfolding of the assembly towards an operational position is achieved by a rotational motion R2 of the arm from the top to the bottom until its stop 19 comes into contact with the fixed part 9 while the abutting of the holographic mirror 10 on the arm 13 is achieved by a rotational motion R1 that is the reverse of the previous motion, directed towards the pilot, so that the retraction of the holographic mirror is done in the reverse direction, frontwards, in the event of a shock.

Figure 6:
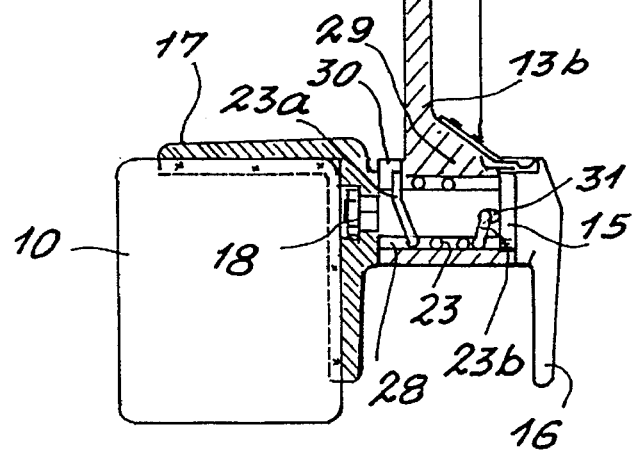
FIG. 6 is a detailed view, on an enlarged scale, of FIG. 5.
Figure 6:
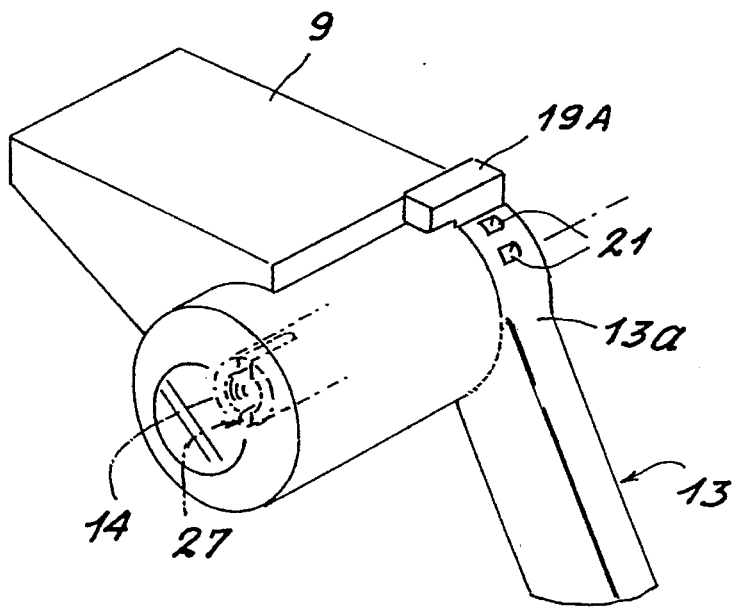

According to a particular embodiment of the invention (FIG. 6), the upper stop 19a is constituted by a removable tappet engaged in a housing 21 chosen as a function of the angular position of the arm 13 to be obtained with respect to the fixed part 9.

The housings 21 are made on an external part of the end 13a of the arm 13 in the vicinity of its hinge 14.

Figure 5:
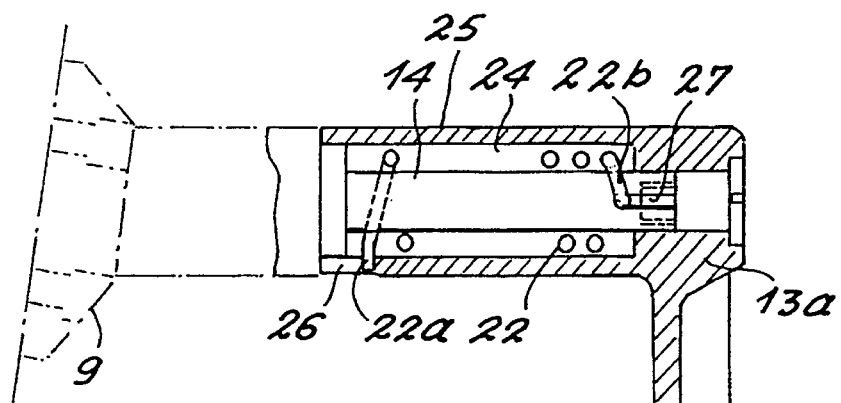
FIG. 5 is a longitudinal sectional view along FIG. 4, on an enlarged scale.

According to another feature of the invention (FIGS. 5 and 6), pull-back springs 22, 23 are interposed between, firstly, the fixed part 9 and the linking arm 13 and, secondly, between said arm 13 and the holographic mirror 10 so that they are respectively kept in a stopped or abutting state, in an operational position, a locking element (not shown) furthermore providing for the cancellation of the effect of the springs 22, 23 in a stowed position.

According to the embodiment shown in the figures, the spring 22 is compressible in rotation during the stowage to relax in the operational position of the combiner. This is also the case for the spring 23.

As is also shown in the figures, the spring 22 is housed in a sheath 24 of a perpendicular extension 23 of the arm 13 in which there is housed the hinge 14, in fact a cylindrical pin.

The ends 22a and 22b of the spring 22 are respectively anchored in housings 26, 27 made respectively in the fixed part 9 and on the opposite end of the hinging pin 14.

In the same way, the spring 23 is housed in a sheath 28 made in a hub 29 of the arm 13 in which there is housed the hinge 15 which is also a cylindrical pin.

In this case, the ends 23a and 23b are respectively anchored in housings 30 and 31 made respectively on a part of the hub 29 of the arm 13 and on the opposite end of the hinging pin 15.

What is claimed is:

1. A retractable holographic combiner comprising a movable holographic mirror positioned in front of a user, wherein said holographic mirror presents light images collimated to infinity, said light images being superimposed over an external image and originating in a projector disposed upstream of said combiner, said holographic mirror being connected to an immovable portion of a vehicle in which said combiner is disposed by an articulated support for holding and positioning said holographic mirror, said articulated support comprising:

a single lateral connecting arm, said connecting arm comprising a first hinge connecting a first end of said arm to said immovable portion of said vehicle, and a second hinge connecting said arm at a second end to a lateral side of the holographic mirror, said first and second hinges being positioned such that an axis of rotation of said first hinge is parallel to an axis of rotation of said second hinge, said axes of rotation of said first and second hinges being perpendicular to a longitudinal axis of said arm;

said second hinge being adapted to provide retraction of said articulated support by rotation of the holographic mirror about said second hinge of said arm, wherein said rotation is performed prior to, or simultaneously with, rotation of said arm about said first hinge; and a manipulating handle for manually adjusting a position of said holographic mirror, wherein said manipulating handle is adapted to be operated using only one hand, said manipulating handle being connected to said holographic combiner.

2. The articulated support of claim 1, wherein said manipulating handle is directly connected to said second hinge.

3. The articulated support of claim 1, further comprising a limiter for limiting angular deflections of said connecting arm with respect to the immovable portion of the vehicle and of said holographic mirror with respect to said arm, thereby providing repeatable positioning of said holographic mirror with respect to said projector.

4. The articulated support of claim 3, wherein said limiter comprises a plurality of stops disposed at predetermined positions between the immovable portion of the vehicle and the upper end of the arm and between the lower end of the arm and the lateral side of the holographic mirror.

5. The articulated support of claim 4, wherein a first stop associated with said first hinge is positioned to enable rotational motion of said arm from a top folded position to a bottom unfolded position about said axis of rotation of said first hinge, said bottom unfolded position being defined by a position where said first stop comes into contact with said immovable portion of said vehicle, and a second stop positioned to enable rotation of said holographic mirror about said second hinge is in a direction opposite a direction of rotational motion of said arm.

6. The articulated support of claim 5 further comprising:

a pull-back spring disposed between the immovable portion of the vehicle and the arm;

a pull-back spring disposed between the arm and the holographic mirror, said pull-back springs maintaining said articulated arm and said holographic mirror in a position defined by said stops; and a locking element for counteracting an effect of said pull-back springs when said springs are pulled.

7. The articulated support of claim 4 further comprising:

a pull-back spring disposed between the immovable portion of the vehicle and the arm;

a pull-back spring disposed between the arm and the holographic mirror, said pull-back springs maintaining said articulated arm and said holographic mirror in a position defined by said stops; and a locking element for counteracting an effect of said pull-back springs when said springs are pulled.

\* \* \* \* \*

UNITED STATES PATENT AND TRADEMARK OFFICE
CERTIFICATE OF CORRECTION

PATENT NO. : 5,517,337
DATED : May 14, 1996
INVENTOR(S) : Catherine DUPIN; Jean M. DARRIEUX It is certified that error appears in the above-indentified patent and that said Letters Patent is hereby corrected as shown below: On the title page: Item [22]

filing date from "August 17, 1993" to

-- September 17, 1993 --.

Signed and Sealed this

Twentieth Day of August, 1996

Attest:

BRUCE LEHMAN

Attesting Officer     Commissioner of Patents and Trademarks